Figure 1:
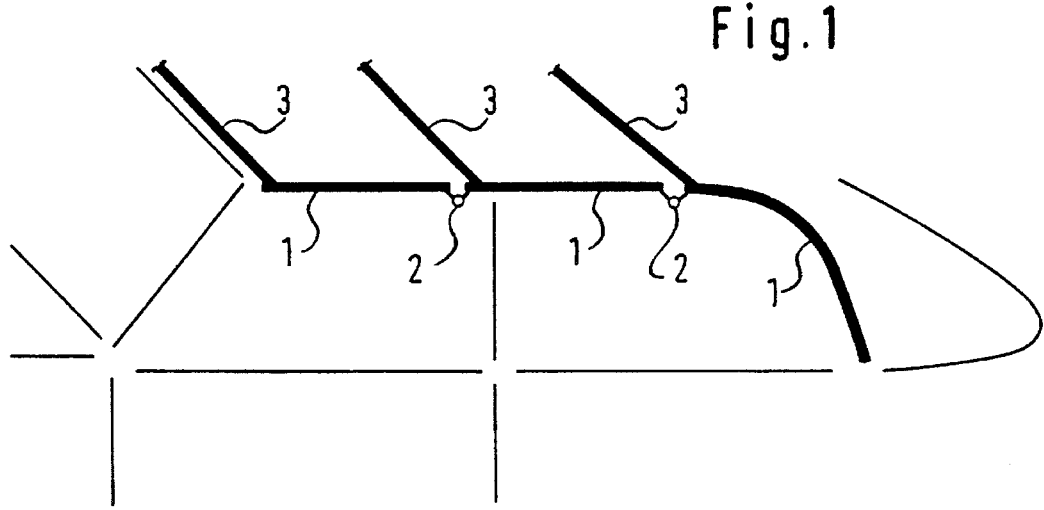

United States Patent [19]

Glagow et al.

[11] Patent Number: 5,601,329
[45] Date of Patent: Feb. 11, 1997

[54] SEALING SYSTEM FOR SEALING VEHICLE WINDOW PANES AGAINST A VEHICLE HOOD

[75] Inventors: Klaus Glagow, Wasserburg; Sebastian Jäger, Hannover, both of Germany

[73] Assignee: Metzeler Automotive Profiles GmbH, Lindau/Bodensee, Germany

[21] Appl. No.: 338,956

[22] Filed: Nov. 14, 1994

[30] Foreign Application Priority Data

Nov. 23, 1993 [DE] Germany .................. 43 39 896.0

[51] Int. Cl.⁶ ........................................ E06B 3/48
[52] U.S. Cl. ........................ 296/146.14; 296/146.2
[58] Field of Search .................... 296/146.14, 146.2, 296/135, 107

[56] References Cited

U.S. PATENT DOCUMENTS 2,746,791  5/1956  Gosselin .................. 296/135 X
5,050,663  9/1991  Rhoads et al. ............. 296/107 X
5,311,702  5/1994  Moore ................... 296/146.14 X

*Primary Examiner*—Joseph D. Pape
*Attorney, Agent, or Firm*—Cumpston & Shaw

[57] ABSTRACT

In a sealing system for sealing the side window panes of a vehicle against the vehicle hood, particularly in cabriolets, by lateral rigid roof frame parts, extending longitudinally, as part of the folding hood rod assembly, for the purpose of equalizing tolerances in sealing the window panes provision is made, according to the invention, that angular window guide profiles capable of vertical, longitudinal and horizontal adjustment and with sealing lips which bear against the window pane and a sealing lip projecting laterally towards the hood, are screwed on to the outer faces of the roof frame parts.

12 Claims, 1 Drawing Sheet

SEALING SYSTEM FOR SEALING VEHICLE WINDOW PANES AGAINST A VEHICLE HOOD

The invention concerns a sealing system for sealing the side window panes of a vehicle against the vehicle hood, particularly in cabriolets, by means of lateral rigid roof frame parts, extending longitudinally, as part of the folding hood rod assembly.

Tolerance problems frequently occur in the sealing of the upper edges of the windows against a folding roof in cabriolets. Compared to vehicles with a fixed roof, these tolerance problems are relatively large, being due to the coincidence of the manufacturing and adjustment tolerances of the normally frameless door, the door window pane, the car body, the hood and the hood sealing. The sealing system must therefore be capable of accommodating these tolerances. In cabriolets, the actual folding hood is attached to a rod assembly comprised of roof frame parts, running longitudinally on both sides above the windows, which are joined together in the longitudinal direction by means of hinges and in the transverse direction by means of straps. The lateral edges of the hood project over the longitudinal roof frame parts and normally also cover the upper edge of the window panes.

Corresponding window guide profiles and window pane seals are normally fastened to the roof frame parts, below the projecting edge of the hood. In this arrangement, the above-mentioned separate tolerances and deformations of the "soft" door window pane result in substantial sealing problems, due to the absence of a frame and the soft hood. The object underlying the present invention, therefore, is to define a sealing system for windows of this type, by means of which given tolerances can be easily equalized in all three coordinates.

This object is achieved, according to the invention, in that angular window guide profiles, capable of vertical, longitudinal and horizontal adjustment and with sealing lips which bear against the window pane, are screwed on to the outer faces of the roof frame parts.

It is particularly expedient if the window guide profile consists of an approximately u-shaped basic profile of an elastomer material reinforced with metal, with two projecting arms, in which the profile base running parallel to the roof frame parts possesses openings, positioned approximately centrally relative to the height of the profile base and, in alignment with these openings, tapped holes in the roof frame parts into which fastening screws are inserted from the profile side.

The diameter of these openings should be greater than the diameter of the threaded shank of the fastening screws.

It is expedient, for the purpose of equalizing the large diameter of the opening, if a washer is inserted between the screw head and the profile base.

Likewise, one or more washers can be inserted in each case between the profile base and the roof frame parts for the purpose of equalizing lateral tolerances.

Expediently, these washers are shaped in the approximate form of a horseshoe, with a curvature in the base area which follows the contour of the roof frame parts and a distance between the two arms which is at least equal to the diameter of the threaded shank of the fastening screws.

For the purpose of tightening from the inside, the fastening screws can have a hexagon socket on the thread end.

With regard to the design of the window guide profile, the ends of one or more of the free arms of the basic profile are expediently angled obliquely inwards, each arm possessing a sealing lip directed towards the window pane.

In addition, a further sealing lip can be directed towards the upper edge of the window pane from the inside of the upper arm.

Finally, an extruded-on sealing lip can be provided against the lateral inside edge of the hood, parallel to the angled section of the longer profile arm.

The construction and functioning of embodiment examples according to the invention are explained in greater detail with reference to a schematic drawing.

FIG. 1 shows a schematic side view of a cabriolet with the roof rod assembly.

Figure 2:
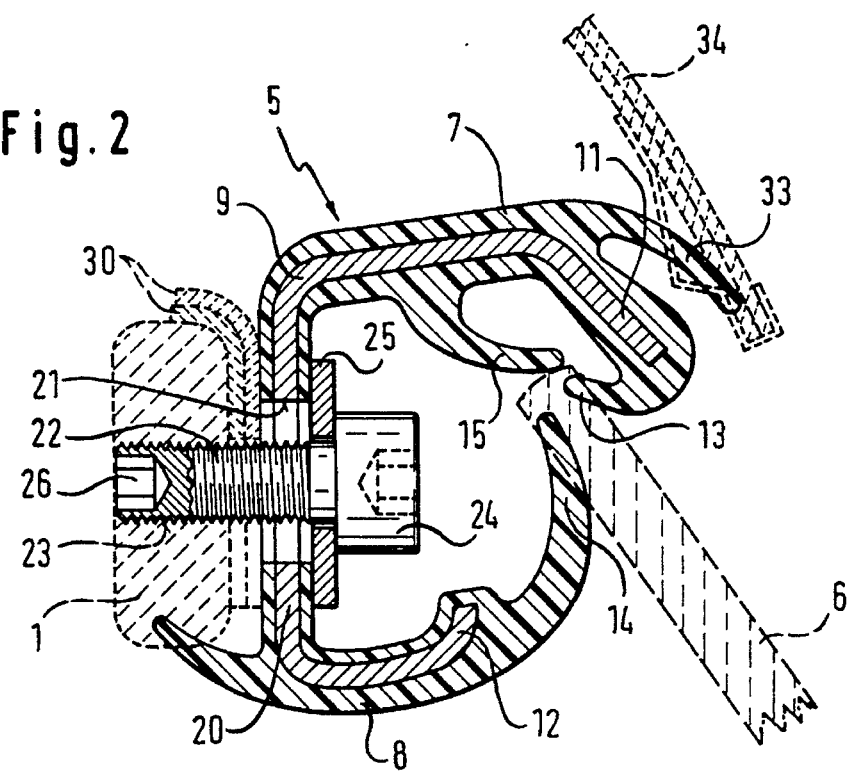

FIG. 2 hows a cross-section through the window guide profile and its fastening to the roof frame part.

Figure 3:
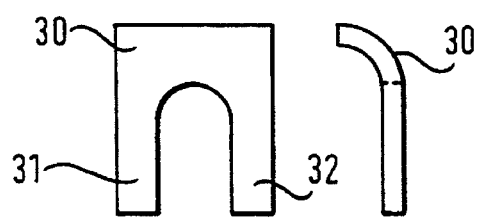

FIG. 3 shows a top view and a side view of a washer.

FIG. 1 shows, in highly schematic form, a side view of a motor vehicle with a folding cabriolet hood. This hood is formed by a hood frame with longitudinal roof frame parts 1, which are joined together by hinges 2, and transverse crossbars 3. The lateral roof frame parts 1 can be composed of a solid steel profile, as shown in FIG. 2 or, alternatively, of a U-shaped deep-drawn metal sheet section.

Fastened to these roof frame parts 1 are window guide profiles 5, as shown in FIG. 2, for receiving and sealing the upper edge of the lowerable window panes 6.

According to the embodiment example illustrated, this profile 5 consists of an approximately U-shaped basic profile with two arms 7 and 8, in which the upper arm 7 can be longer than the lower arm 8. The complete profile 5 is made from an elastomer material with a metal reinforcement 9. The free ends of the arms 7 and 8 can have a bend 11 and 12, inclined obliquely inwards, attached to each of which there is a sealing lip 13 and 14 directed towards the window pane 6. A further sealing lip 15 projects from the inside of the arm 7 towards the upper edge of the window pane 6. In addition, another sealing lip 33 can be provided against the lateral inside edge of the hood 34, extruded on to the upper arm 7.

For the purpose of fastening this profile 5 to the roof frame parts 1, the profile base 20 running parallel to the roof frame parts i has openings 21, positioned approximately centrally relative to the height of the profile base, through which fastening screws 24 can be passed, from the inside of the profile 5, which are screwed into corresponding tapped holes 23 in the roof frame part 1. The openings 21 have a relatively large diameter which, depending on the magnitude of the tolerances to be equalized, can be up to double the size of the diameter of the threaded shank 22 of the fastening screws 24, or even larger.

In mounting, the fastening screws 24, together with the washers 25, which have an outside diameter greater than that of the openings 2, are inserted through the window running section of the profile 5 into the corresponding openings 21 in the profile. These screws 24 are then screwed into the roof frame parts 1, either through the window running section of the sealing profile 5 or from the inside of the roof frame, by means of a hexagon socket 26 in the threaded end of the screw 24.

At the same time, the necessary numbers of horseshoe-shaped washers 30 are inserted between the profile 5 and the roof frame parts 1. These washers 30 are shown again in FIG. 3, in both top and side views, the upper end being curved to match the upper contour of the roof frame parts 1 and the distance between the two arms 31 and 32 being approximately equal to the diameter of the threaded shank 22 of the fastening screws 24.

Due to the relatively large diameter of the openings 21, the profile 5 can be freely adjusted both longitudinally and vertically relative to the roof, by an amount which is practically half the difference in the diameters of the screw shanks 22 and the openings 21. Horizontal adjustments can be made by the addition or removal of washers 30.

Following optimized adjustment of the profile 5 relative to the window pane 6, the screws 24 are finally tightened, readjustment on the assembled vehicle being possible at any time.

The arrangement described— in which the sealing profile may also be differently constructed— therefore permits easy and precise adjustment of this profile relative to the window pane for the purpose of equalizing given tolerances.

We claim:

1. Sealing system for sealing side window panes of a vehicle against the a vehicle hood, comprising:

a folding hood rod assembly having rigid roof frame edge parts having outer faces, extending longitudinally; window guide profiles capable of vertical, longitudinal and horizontal adjustment screwed on to the outer faces of the roof frame parts, the window guide profiles including sealing lips which bear against a window pane.

2. Sealing system according to claim 1, in which the window guide profile comprises an approximately U-shaped basic profile of an elastomer material with a metal reinforcement, with two projecting arms and a profile base running parallel to the roof edge frame parts (1) having openings positioned approximately centrally relative to the height of the profile base and, in alignment with these the openings, tapped holes in the roof frame parts and fastening screws having a threaded shank inserted from the profile side.

3. Sealing system according to claim 2, in which the openings have a diameter which is greater than the diameter of the threaded shank of the fastening screws.

4. Sealing system according to claim 2, comprising a washer inserted between the screw head and the profile base.

5. Sealing system according to claim 2, comprising one or more washers inserted between the profile base and the roof edge frame parts.

6. Sealing system according to claim 5 in which the washers are shaped in the approximate form of a horseshoe including a base area and two arms, with a curvature in the base area which follows the contour of the roof frame edge parts and a distance between the two arms which is at least equal to the diameter of the threaded shank of the fastening screws.

7. Sealing system according to claim 2, in which the fastening screws have a hexagon socket in the threaded end.

8. Sealing system according to claim 2, in which first and second ends of at least one of the projecting arms of the U-Shaped basic profile has a bend angled obliquely inwards, and also comprising a sealing lip directed towards the window pane extruded on to the end of each arm.

9. Sealing system according to claim 2, comprising a further sealing lip directed towards the upper edge of the window pane from the inside of an upper arm.

10. Sealing system according to claim 8, comprising an extruded sealing lip engaging an inside edge of the hood, parallel to an angled section of the profile arm.

11. Sealing system according to claim 3, comprising a washer inserted between the screw head and the profile base.

12. Sealing system according to claim 9, comprising an extruded sealing lip engaging an inside edge of the hood, parallel to an angled section of the profile arm.

* * * * *